Jan. 25, 1927.
F. M. POOLE
1,615,482
TUBE OIL HEATER CONTROL
Filed June 21, 1926
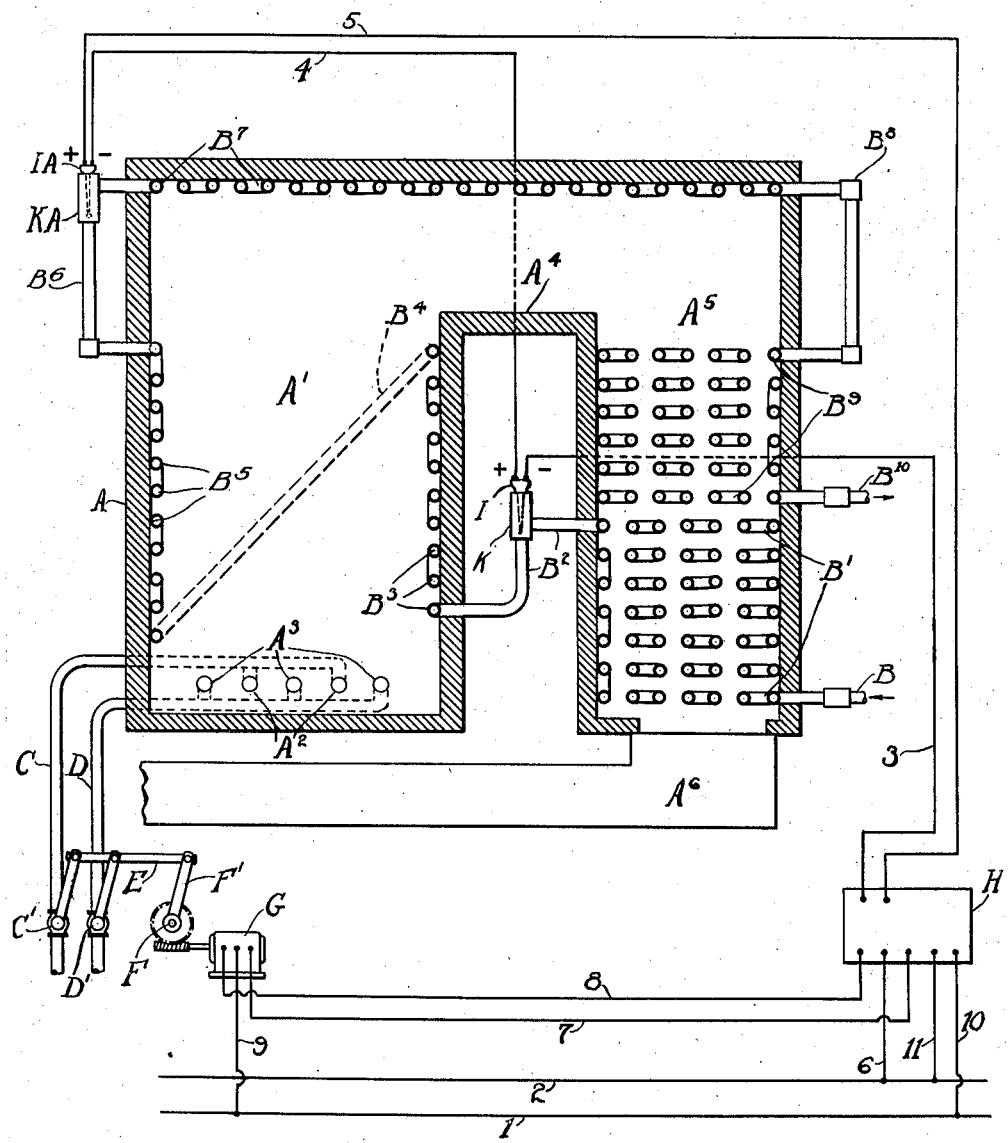
INVENTOR
FOSTER M. POOLE
BY
John E. Hubbell
ATTORNEY Patented Jan. 25, 1927.

1,615,482

UNITED STATES PATENT OFFICE.

FOSTER M. POOLE, OF TULSA, OKLAHOMA, ASSIGNOR TO THE BROWN INSTRUMENT COMPANY, OF PHILADELPHIA, PENNSYLVANIA, A CORPORATION OF PENNSYLVANIA.

TUBE OIL-HEATER CONTROL.

Application filed June 21, 1926. Serial No. 117,360.

The general object of the present invention is to provide an improved method of, and improved means for regulating the operation of tube oil heaters such as are used in refining petroleum, and particularly in cracking processes.

The invention is characterized by the fact that an approximately constant oil exit temperature is obtained by varying the oil heating effect, not in direct response to fluctuations in the exit oil temperature, but in response to the temperature of the oil at one or more, and preferably not less than two points in its path of flow through the heater at which the oil temperature attained is appreciably below the exit oil temperature.

The invention is of especial utility in tubular oil cracking heaters of the type in which the path of flow through the tubes is so elongated relative to the velocity of the oil that a considerable period of time, for example, 30 or 45 minutes, is required for a particle of oil to travel from the inlet to the outlet of the heater. In such a heater a regulation of the heating effect directly dependent on the exit oil temperature necessarily involves a substantial time lag and a resultant fluctuation or hunting of the exit oil temperature, whereas by making the regulation dependent on the temperature attained by the oil during its travel through a suitable intermediate portion or portions of its path of flow through the heater, conditions tending to exit oil temperature variations may be corrected or compensated for quickly enough to prevent them from manifesting themselves in material changes in exit oil temperature.

In a tubular oil heater of the type in which some of the tubes are heated wholly or mainly by radiant heat while others are heated wholly or mainly by contact with the heating gases passing over them, regulation in accordance with the present invention is advantageously made jointly responsive to the temperature of the oil as it leaves a portion of its path of flow in which heat is absorbed mainly by contact with the heating gases, and to the temperature of the oil as it leaves a portion of the heater in which heat is absorbed wholly or mainly by radiation. By proceeding in this manner suitable allowance may be made for the fact that changes in operating conditions do not make similar changes in the rates of heat absorption by the portion of the apparatus heated by contact with heating gases, and by the portion heated wholly or mainly by the absorption of radiant heat.

The actual adjustment of the heating effect regulated in accordance with the present invention, can be made in various ways, as by varying the rate at which the oil to be heated is moved through the heater, or by varying the rate of combustion of the fuel burned to heat the oil, or by varying the conditions of combustion, or by simultaneously varying any two or more of the factors mentioned above. In the ordinary practice of the invention, it is convenient to vary the heating effect when required by varying the rate of combustion while passing oil to be heated to the heater at a rate which is constant, or, if not constant, is not varied for the purpose of controlling the final temperature of the oil. In varying the rate of combustion in accordance with the present invention, any usual or suitable procedure may be followed, such as simultaneously and positively varying the rate of supply of fuel and combustion supporting air, or varying the fuel in direct response to the need for heat and varying the quantity of combustion supporting air as required to maintain a constant $CO_2$ flue gas content, or varying the fuel supply without attempting to prevent or directly regulate fluctuations in the percent of excess air supplied to the combustion chamber of the still.

The various features of novelty which characterize my invention are pointed out with particularity in the claims annexed to and forming a part of this specification. For a better understanding of the invention however, its advantages and specific objects attained by it, reference should be had to the accompanying drawings and descriptive matter in which I have illustrated and described a preferred embodiment of the invention.

The one figure of the drawing is a diagrammatic representation of a tubular oil heater and its regulating provisions.

In the drawings I have illustrated the use of my present invention, in controlling the rate of combustion in a tube oil heater or cracking still A which comprises a combustion chamber A', with one or more fuel inlets $A^2$, and one or more air inlets $A^3$ at the bottom of the combustion chamber. In a still of the type illustrated a plurality of fuel inlets and a plurality of air inlets are ordinarily provided in each end wall of the combustion chamber. The burning gases and products of combustion pass from the upper end of the combustion chamber $A'$ over a bridge wall $A^4$ into the upper ends of a heating chamber $A^5$ from the lower end of which the heating gases issue through an outlet or stack connection $A^6$.

B represents the inlet for the oil to be heated which passes first through a bank of tubes $B'$ in the lower portion of the heating chamber $A^4$, thence through external connections $B^2$ to the lower one of a row of tubes $B^3$ lining the combustion chamber wall formed by the bridge wall $A^4$. After passing successively through the tubes $B^3$ at successively higher levels, the oil passes through a connection $B^4$ to the lowermost one of a row of tubes $B^5$ lining the wall of the combustion chamber opposing the bridge wall. The connection $B^4$ may be either within or outside of the chamber $A'$, and, as shown, is outside of that chamber. After passing successively through the tubes $B^5$ at successively higher levels, the oil passes through a connection $B^6$ to the adjacent one of a row of tubes $B^7$ lining the common roof of the combustion chamber $A'$ and heating chamber $A^5$. After passing successively through the row of tubes $B^7$, the oil leaves the latter at the end of the row opposite to that connected to the tubes $B^5$ through a connection $B^8$. The oil passes from the connection $B^8$ into the top of a bank of tubes $B^9$ through which the oil passes successively through the tubes at successively lower levels to the oil outlet $B^{10}$.

C represents a fuel oil supply pipe having branch outlets to the fuel inlets $A^2$ and serving to supply to the combustion chamber fluid fuel, either oil or gas, which may form all or a portion only of the fuel burned in the combustion chamber A. The rate at which fuel is supplied by the pipe C depends upon the adjustment of a control valve $C'$. As shown, some or all of the air supporting combustion is supplied to the combustion chamber through a supply pipe D at a rate depending on the adjustment of a valve $D'$ therein. As shown, the valves $C'$ and $D'$ are simultaneously adjusted to increase or decrease the amounts of fuel and air supplied by the pipes C and D, respectively, by a motor G connected by a worm and gear connection to the operating arms of the valves $C'$ and $D'$ by a link E. With this arrangement, rotation of the motor G in one direction increases the fuel and air supplies to the combustion chamber $A'$, while rotation of the motor G in the opposite direction decreases said supplies.

The motor G is automatically set into operation to increase or decrease the rate of combustion in the combustion chamber $A'$ by an automatic control instrument H which responds to variations in the temperature of the oil being heated at two intermediate points in the path of oil flow. The control instrument H may comprise an indicating or recording galvanometer with control provisions of known form, such, for example, as those shown in the patent to Brown, No. 1,355,448, granted October 12, 1920. The galvanometer of the control instrument H has its terminals connected into a circuit including a conductor 3, a thermo-couple I, a conductor 4, a thermo-couple IA, and a conductor 5. The thermo-couple I is inserted in a thermometer well K located in the pipe connection $B^2$, and the thermo-couple IA is inserted in a thermometer well KA located in the pipe connection $B^6$. The thermo-couples are connected in series so that the voltage impressed upon the galvanometer of the instrument H is the sum of the voltages of the thermo-couples I and IA.

In the intended operation of the apparatus shown in Fig. 1, when the sum of the E. M. F.'s of the thermo-couples I and IA exceeds a predetermined value, the control instrument H connects the conductor 8 to the conductor 6 and thereby causes the motor to be energized from supply conductors 1 and 2, through a circuit including conductors 6, 8 and 9. Thus energized, the motor G operates in a direction to decrease the rate of combustion in the combustion chamber $A'$. When the sum of the E. M. F.'s of the thermo-couples I and IA falls below a predetermined value, the controller H connects the conductor 6 to the conductor 7 and thereby energizes the motor G through a circuit including conductors 6, 7, and 9 so that the motor G will rotate in the direction to increase the rate of combustion in the combustion chamber $A'$. Conductors 11 and 10 form means for supplying current from the conductors 1 and 2 to the relay and timing mechanisms of the controller H which need not be described herein.

In the type of tubular oil heater shown in the drawings, the tubes $B'$ may well constitute about a quarter of the oil heating surface, and the tubes $B'$, $B^3$, and $B^5$ may well constitute about two thirds of the oil heating surface of the heater. The tubes $B^3$, $B^5$, and $B^7$ absorb heat mainly by direct radiation, whereas the tubes $B'$ and $B^9$ are heated mainly by contact with the heating gases passing over them. While the tubes $B^9$ absorb considerable heat that heat is largely utilized in cracking and vaporizing the oil rather than in changing its temperature. The type of tubular oil heater shown is one primarily devised for use in a method of oil cracking in which the quantity rate of oil supply is so proportioned relative to the length of flow path formed by the oil heating tubes that a considerable period of time, such as half or three quarters of an hour, is required for the passage of any individual particle of oil from the heater inlet B to the heater outlet B¹⁰. In the heater shown, the rate at which the tubes B³, B⁵, and B⁷ absorb radiant heat is primarily a function of the combustion chamber temperature which at any instant is largely dependent on the temperature of the refractory portions of the combustion chamber walls. Those walls have a considerable heat storage temperature equalizing capacity, and changes in the rate at which the radiant heat is absorbed lag behind the changes in the rate of combustion which result in changes in furnace chamber temperatures.

The amount of heat absorbed by the tubes B' and B⁹ depends primarily on the weight of heating gases and on the temperature at which those gases reach the tubes. The time required for the heating gases to pass through the chambers A' and A⁵ is very brief, of the order of a second or two. The weight of the gases passing over the tubes B⁹ and B', therefore, varies practically in unison with changes in the rate of combustion. Furthermore, the temperatures at which the heating gases reach the tubes B⁹ and B' normally begin to increase or decrease as soon as the rate of combustion is increased or decreased, respectively, since the temperature of the gases is increased and decreased not only by combustion chamber temperature changes but also by decreases and increases, respectively, in the time period during which each gas particle is in the combustion chamber and is being cooled by radiation to the combustion chamber walls and to the tubes B³, B⁵, and B⁷.

From the foregoing explanations it will be apparent that in an oil heater constructed and operated as described, a control of the heating effect supplied in direct response to fluctuations in the exit oil temperature will inevitably result in substantial fluctuations of that temperature, since changes in furnace conditions may produce significant changes in exit oil temperature which do not fully develop until some minutes after the changes in furnace conditions occur. I have found, however, that with the arrangement illustrated in the drawing such changes in furnace conditions can be compensated for as required to maintain an approximately uniform exit oil temperature.

A desirable characteristic of the invention arises from the fact that the thermo-couples I and IA respond at different rates and in different ways to such changes in operating conditions as variations in the rate of combustion, and in the temperature at which the oil is supplied to the heater inlet B. The oil temperature in the thermometer well K begins to change almost immediately after, and as a result of a change in the rate of combustion, and changes much more quickly than does the oil temperature in the thermometer well KA as a result of a change in the temperature at which the oil enters the heater inlet B. Since a change in the rate of combustion tends to immediately increase or decrease the amount of heat absorbed by the tubes B' as well as by the tubes B⁹, and if continued will produce a change in the same direction of the amount of heat absorbed by the radiant heat absorbing tubes B³, B⁵, and B⁷, an increase or decrease in the rate of combustion quickly reacts on the control mechanism through the thermo-couple I, and the latter, therefore, tends to compensate not only for the change which has already occurred in the rate of heat absorption by the tubes B' and B⁹, but also anticipates and minimizes the resultant subsequent change in the rate of heat absorption by the radiant heat absorbing tubes B³, B⁵, and B⁷. The aggregate reaction on the regulating system of a change in furnace condition should include a time factor corresponding to the period required for the development of the full difference between the rates at which radiant heat is absorbed with the two rates of combustion, and this time factor is taken care of by the thermo-couple IA.

Ordinarily I have found it advisable to give more importance to the oil temperature to which the thermo-couple IA is exposed than to the oil temperature to which the thermo-couple I is exposed. This result may readily be secured by using thermo-couples I and IA having different characteristics, and may be obtained with thermo-couples having the same characteristics by the simple expedient of inserting the thermo-couple I less deeply in the well K than the thermo-couple IA is inserted in the well KA. Regardless of the relative importance which the two thermo-couples should have, care should be taken, when two thermo-couples are connected in series as are the thermo-couples I and IA, to prevent short circuits such as would occur if both thermo-couples were grounded through the heater tubes.

With the described method of control, the change in the heating effect resulting from any one of the successive adjustments of the valves C' and D' need not be closely proportional to the change then theoretically required in the rate at which heat is supplied if the time intervals between successive adjustments are comparatively short, since the effect of an over adjustment in the rate of combustion is neutralized by a subsequent adjustment, and in practice the fluctuations above and below normal of the oil temperature at either thermometer well may thus be averaged out before the oil reaches the heater outlet. Certain novel subject matter disclosed but not claimed in this application is claimed in my co-pending application, Serial No. 46,515, filed July 28, 1925.

While in accordance with the provisions of the statutes, I have illustrated and described the best form of my invention now known to me it will be apparent to those skilled in the art that formal changes in the apparatus may be made without departing from the spirit of my invention, and in particular that the invention in its broader aspect is capable of use in, or in connection with tubular oil heaters differing in type from that specifically illustrated herein.

Having now described my invention what I claim as new and desire to secure by Letters Patent is:—

1. In operating an oil heater of the type comprising tubes connected to form an elongated path of oil flow and means for heating said tubes to thereby progressively heat the oil traveling along said path, the method which consists in varying the oil heating effect in response to variations in the temperature of the oil at each of two points so located along said path that an appreciable difference in oil temperature normally exists at the two points and that the oil temperature at each point is appreciably different from both the initial and the final oil temperatures.

2. In operating an oil heater of the type comprising tubes connected to form an elongated path of oil flow and means for heating said tubes to thereby progressively heat the oil traveling along said path mainly by contact with heating gases in one portion of said path and by the absorption of radiant heat in another portion of said path, the improvement which consists in varying the oil heating effect in joint response to variations in the temperatures respectively attained by the oil in passing through said portions.

3. In operating an oil heater of the type comprising tubes connected to form an elongated path of oil flow and means for supplying heat mainly in the form of radiant energy to tubes forming one portion of said path, and mainly by contact with heating gases to tubes forming another portion of said path, the method which consists in regulating the heat absorbed by the oil in joint response to the temperatures attained by the oil in said portions.

4. In operating an oil heater of the type comprising tubes connected to form an elongated path of oil travel and fuel burning means for heating said tubes so as to thereby progressively heat oil traveling along said path, the method which consists in varying the oil heating effect in joint response to the temperatures attained by the oil in portions of said path of oil travel in which dissimilar changes in the rate of heat absorption are produced by a given change in the rate at which fuel is burned.

5. In operating an oil heater of the type comprising tubes connected to form an elongated path of oil travel and means for heating said tubes to thereby progressively heat the oil traveling along said path, the method which consists in varying the oil heating effect in joint response to variations in the heat absorption by the temperature of the oil in each of two different portions of said path.

6. In a tubular oil heater comprising tubes connected to form an elongated path of flow for the oil to be heated and means regulating the supply of heat to said tubes comprising control means jointly responsive to the temperature of the oil at a plurality of points along said path of flow between which a difference in oil temperature exists, and at each of which the oil temperature is different from the oil temperature at either end of said path.

7. In a tubular oil heater comprising a combustion chamber and tubes connected to provide an elongated path of flow for the oil to be heated and so disposed that the tubes forming one portion of said path are heated mainly by radiant heat absorbed from said combustion chamber while tubes forming a second portion of said path are heated mainly by contact with heating gases leaving the combustion chamber, the improvement which consists in means regulating the rate of combustion in said combustion chamber including a device responsive to changes in the rate of heat absorption in said one portion and a device responsive to changes in the rate of heat absorption in said second portion.

8. In a tubular oil heater comprising a combustion chamber and a heating chamber separated by a bridge wall over which the heating gases from the combustion chamber pass in to the heating chamber, comprising tubes connected to form an elongated path of gas flow including one portion traversed by the heating gases passing through the heating chamber, and a second portion absorbing radiant heat from the combustion chamber, the improvement which consists in means regulating the rate of combustion in said combustion chamber including a device responsive to changes in the rate of heat absorption in said one portion and a device responsive to changes in the rate of heat absorption in said second portion.

9. In a tubular oil heater comprising a combustion chamber and a heating chamber separated by a bridge wall over which the heating gases from the combustion chamber pass in to the heating chamber and comprising tubes connected to form an elongated path of oil flow including an initial portion traversed by the heating gases passing through the heating chamber, and an intermediate portion absorbing radiant heat from the combustion chamber and a final portion traversed by the heating gases in the heating chamber before said gases contact with said initial portion, the improvement which consists in means regulating the rate of combustion in said combustion chamber including a device responsive to changes in the rate of heat absorption in said initial portion and a device responsive to changes in the rate of heat absorption in said intermediate portion.

Signed at Tulsa, in the county of Tulsa, and State of Oklahoma, this 14th day of June A. D. 1926.

FOSTER M. POOLE.